United States Patent
Yan et al.

(10) Patent No.: US 10,908,024 B2
(45) Date of Patent: Feb. 2, 2021

(54) APPARATUS AND METHOD FOR ONLINE AND REAL-TIME DETECTION OF TEMPERATURE OF EPITAXIAL WAFER

(71) Applicant: AK OPTICS TECHNOLOGY CO., LTD., Beijing (CN)

(72) Inventors: Dong Yan, Beijing (CN); Chengmin Li, Beijing (CN); Linzi Wang, Beijing (CN); Jianpeng Liu, Beijing (CN); Longmao Ye, Beijing (CN)

(73) Assignee: AK OPTICS TECHNOLOGY CO., LTD., Beijing (CN)

( * ) Notice: Subject to any disclaimer, the term of this patent is extended or adjusted under 35 U.S.C. 154(b) by 492 days.

(21) Appl. No.: 16/317,024

(22) PCT Filed: Aug. 19, 2014

(86) PCT No.: PCT/CN2014/084685
§ 371 (c)(1),
(2) Date: Jan. 10, 2019

(87) PCT Pub. No.: WO2015/081728
PCT Pub. Date: Jun. 11, 2015

(65) Prior Publication Data
US 2019/0346308 A1 Nov. 14, 2019

(30) Foreign Application Priority Data
Dec. 5, 2013 (CN) .......................... 2013 1 0651743

(51) Int. Cl.
*G01J 5/00* (2006.01)
*G01J 5/08* (2006.01)
(Continued)

(52) U.S. Cl.
CPC .......... *G01J 5/0007* (2013.01); *G01J 5/0896* (2013.01); *G01J 5/522* (2013.01); *G01J 5/58* (2013.01); *G01J 2005/0059* (2013.01)

(58) Field of Classification Search
None
See application file for complete search history.

(56) References Cited

U.S. PATENT DOCUMENTS

H001264 H * 12/1993 Epler ............................ 117/103
10,731,973 B2 * 8/2020 Liu ...................... G01B 11/245

FOREIGN PATENT DOCUMENTS

EP 708318 * 4/1996 ............ G01J 5/0003
EP 0708318 A1 4/1996
(Continued)

OTHER PUBLICATIONS

An Office Action in relation to the priority CN patent application No. 201310651743.0.

*Primary Examiner* — Tung S Lau
(74) *Attorney, Agent, or Firm* — Platinum Intellectual Property LLP

(57) ABSTRACT

An apparatus and a method for online and real-time detection of a temperature of an epitaxial wafer (4) belong to the technical field of semiconductor detection. The apparatus comprises a MOCVD reaction chamber (1), a light source (6), a beam splitter (7), a reference light detector (8), a reflected light detector (9) and a data acquisition unit (10). The method, on the basis of the apparatus, can obtain a thermal radiation attenuation factor caused by a coating of a reactor chamber window and a reflectance attenuation factor caused by the coating of the reactor chamber window for the epitaxial wafer (4). The apparatus and method can eliminate influence of the coating of the reactor chamber window on an online and real-time temperature detection value, thereby (Continued)

improving the accuracy of the online and real-time temperature detection value.

10 Claims, 4 Drawing Sheets

(51) Int. Cl.
  *G01J 5/52* (2006.01)
  *G01J 5/58* (2006.01)

(56) References Cited

FOREIGN PATENT DOCUMENTS

| WO | WO 2015081727 | * | 6/2015 | ....... H01L 21/67248 |
| WO | WO 2015081728 | * | 6/2015 | ................ G01J 5/58 |

* cited by examiner

APPARATUS AND METHOD FOR ONLINE AND REAL-TIME DETECTION OF TEMPERATURE OF EPITAXIAL WAFER

RELATED APPLICATIONS

This application is a United States National Stage Application filed under 35 U.S.C 371 of PCT Patent Application Serial No. PCT/CN2014/084685, filed Aug. 19, 2014, which claims Chinese Patent Application Serial No. CN 201310651743.0, filed Dec. 5, 2013, the disclosure of all of which are hereby incorporated by reference in their entirety.

TECHNICAL FIELD

The present disclosure relates to the technical field of semiconductor detection, and in particular, to an apparatus and method for online and real-time detection of a temperature of an epitaxial wafer.

BACKGROUND OF THE INVENTION

Temperature is a key factor for detection in a process of epitaxial wafer such as chemical vapor deposition (CVD) and molecular beam epitaxy (MBE). Due to strict reaction conditions, such as high vacuum, high temperature, chemically active environment, high-speed rotating substrate, etc., it is almost impossible to directly detect a temperature of an epitaxial wafer technically. Therefore, in order to improve product performance, reduce production cost, and optimize process control, the prior art generally adopts an online optical detection system which uses a thermal radiation-based optical temperature measurement technology to detect the temperature of an epitaxial wafer in the process of growth thereof in real time.

However, when such an online optical detection system is adopted, while an epitaxial film is grown, a reaction chamber window will be coated with one or more additional films. Because the optical temperature measurement technology based on thermal radiation is greatly affected by window coating, a deviation between an actual value of the temperature of the epitaxial wafer and a detected value thereof may reach 10° C. Cleaning or replacing the window can reduce the deviation between the actual value of the temperature of the epitaxial wafer and the detected value thereof. However, cleaning or replacing the window will bring huge time cost and material cost to the production line.

SUMMARY OF THE INVENTION

In order to solve the above problems, the present disclosure proposes an apparatus and a method for online and real-time detection of a temperature of an epitaxial wafer, which introduces a reflectance attenuation factor and a thermal radiation attenuation factor in the online and real-time temperature measurement technique based on thermal radiation, thereby eliminating the influence of a coating of a reaction chamber window on an online and real-time temperature detection value, and improving the accuracy of the online and real-time temperature detection value.

The apparatus for online and real-time detection of a temperature of an epitaxial wafer according to the present disclosure may comprise a MOCVD reaction chamber, a light source, a beam splitter, a reference light detector, a reflected light detector and a data acquisition unit, wherein, the MOCVD reaction chamber is provided with a graphite susceptor therein, the graphite susceptor being able to rotate and used to bear the epitaxial wafer, and a top of the MOCVD reaction chamber is provided with a reaction chamber window for enabling light to pass therethrough;

the light source is configured to generate a light beam;

the beam splitter is configured to split the light beam received from the light source into two beams, and wherein one of the two beams after entering the reference light detector, forms a first path of electrical signal, and the other of the two beams passes through the reaction chamber window and then strikes on the epitaxial wafer and forms a reflected light beam after being reflected by the epitaxial wafer, the reflected light beam forming a second path of electrical signal after passing through the reflected light detector; and the data acquisition unit is configured to acquire the first path of electrical signal and the second path of electrical signal.

The method for online and real-time detection of a temperature of an epitaxial wafer according to the disclosure may comprise the following steps:

Step 1: obtaining a reflected light intensity of the epitaxial wafer and a thermal radiation intensity of the epitaxial wafer respectively based on a second path of electrical signal detected by a reflected light detector when a light source is turned on and a second path of electrical signal detected by the reflected light detector when the light source is turned off, $$I_{refl} = I_{on} - I_{off}$$

$$L(\lambda, T) = I_{off}$$

where, $I_{on}$ is the second path of electrical signal detected by the reflected light detector when the light source is turned on, $I_{off}$ is the second path of electrical signal detected by the reflected light detector when the light source is turned off, $I_{refl}$ is the reflected light intensity of the epitaxial wafer, $L(\lambda, T)$ is the thermal radiation intensity of the epitaxial wafer;

Step 2: obtaining a reflectance of the epitaxial wafer based on the reflected light intensity of the epitaxial wafer and a reference light intensity, $$R = m \times \frac{I_{refl}}{I_{refe}} \quad (1)$$

where,

R is the reflectance of the epitaxial wafer, m is a ratio of light intensity of a reference light to an incident light, $I_{refl}$ is a reflected light intensity of the epitaxial wafer, $I_{refe}$ is the reference light intensity;

Step 3: obtaining a reflectance attenuation factor caused by a coating of a reaction chamber window based on the reflectance of the epitaxial wafer and an ideal reflectance of the epitaxial wafer, $$\Delta T_R = \frac{R}{R_0} \quad (2)$$

where, $\Delta T_R$ is the reflectance attenuation factor caused by the coating of the reaction chamber window, R is the reflectance of the epitaxial wafer, $R_0$ is the ideal reflectance of the epitaxial wafer;

Step 4: obtaining a thermal radiation attenuation factor caused by the coating of the reaction chamber window based on the reflectance attenuation factor caused by the coating of the reaction chamber window, $$\Delta T_T = \sqrt{\Delta T_R} \quad (3)$$

where, $\Delta T_T$ is the thermal radiation attenuation factor caused by the coating of the reaction chamber window, $\Delta T_R$ is the reflectance attenuation factor caused by the coating of the reaction chamber window;

Step 5: calculating a black-body thermal radiation value $P_b(\lambda, T)$ of the epitaxial wafer based on the thermal radiation intensity $L(\lambda, T)$ of the epitaxial wafer, the reflectance R of the epitaxial wafer, the thermal radiation attenuation factor $\Delta T_T$ caused by the coating of the reaction chamber window, and the reflectance attenuation factor $\Delta T_R$ caused by the coating of the reaction chamber window, $$P_b(\lambda, T) = \frac{L(\lambda, T)/\Delta T_T}{\varepsilon(R/\Delta T_R)} \quad (4)$$

where, $P_b(\lambda, T)$ is the black-body thermal radiation value, $L(\lambda, T)$ is the thermal radiation intensity of the epitaxial wafer, R is the reflectance of the epitaxial wafer, $\Delta T_T$ is the thermal radiation attenuation factor caused by the coating of the reaction chamber window, $\Delta T_R$ is the reflectance attenuation factor caused by the coating of the reaction chamber window, $\varepsilon(R/\Delta T_R)$ is a thermal emissivity of the epitaxial wafer;

Step 6: obtaining a temperature T of the epitaxial wafer based on a correspondence relationship between the black-body thermal radiation value $P_b(\lambda, T)$ and the temperature T of the epitaxial wafer, $$P_b(\lambda, T) = \frac{2\pi hc^2}{\lambda^5} \cdot \frac{1}{e^{hc/kT\lambda} - 1} \quad (5)$$

where, $P_b(\lambda, T)$ is an ideal black-body thermal radiation value, h is Planck constant, k is Boltzmann constant, c is light speed, λ is wavelength, T is temperature.

The apparatus and method for online and real-time detection of a temperature of an epitaxial wafer according to the present disclosure can obtain a thermal radiation attenuation factor $\Delta T_T$ caused by the coating of the reaction chamber window 5 and a reflectance attenuation factor $\Delta T_R$ caused by the coating of the reaction chamber window 5 for the epitaxial wafer 4, apply the two attenuation factors $\Delta T_T$ and $\Delta T_R$ to a calculation process of a black-body thermal radiation value of the epitaxial wafer 4, and take advantage of the relationship between the black-body thermal radiation value of the epitaxial wafer 4 obtained by calculation and the temperature of the epitaxial wafer 4, thereby eliminating the effect of the coating of the reaction chamber window 5 on an online and real-time temperature detection value and improving the accuracy of the online and real-time temperature detection value.

DETAILED DESCRIPTION OF THE INVENTION

The present invention will be described in detail below in conjunction with the drawings and specific embodiments in order to understand the invention thoroughly.

Figure 1:
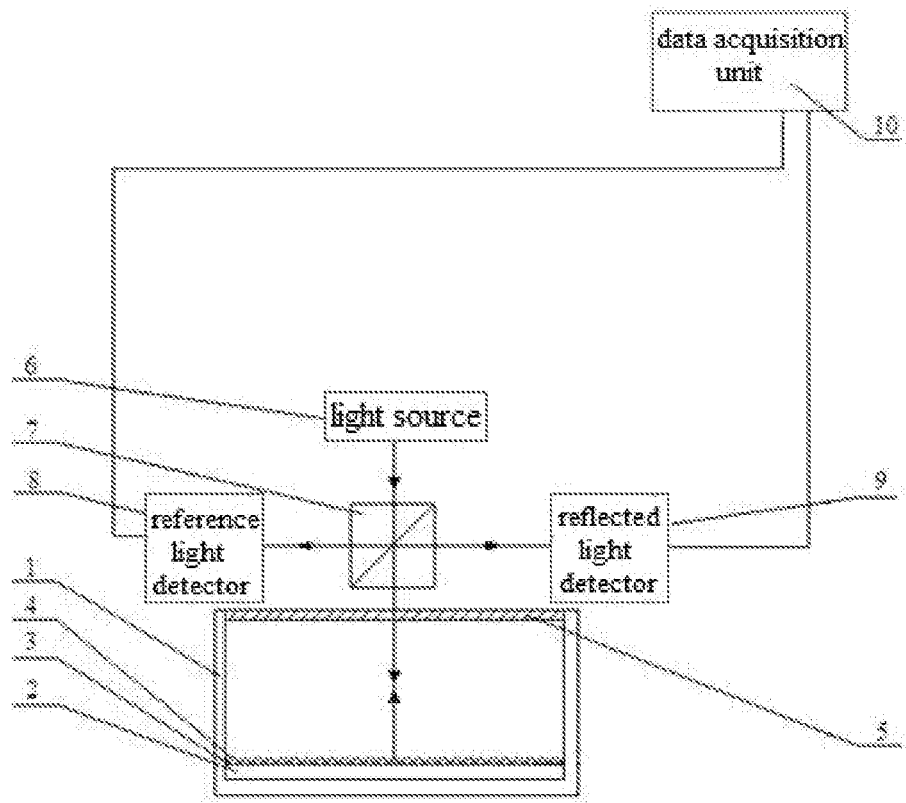
FIG. 1 is a schematic structural diagram of an apparatus for online and real-time detection of a temperature of an epitaxial wafer according to a first embodiment of the present invention.
Figure 2:
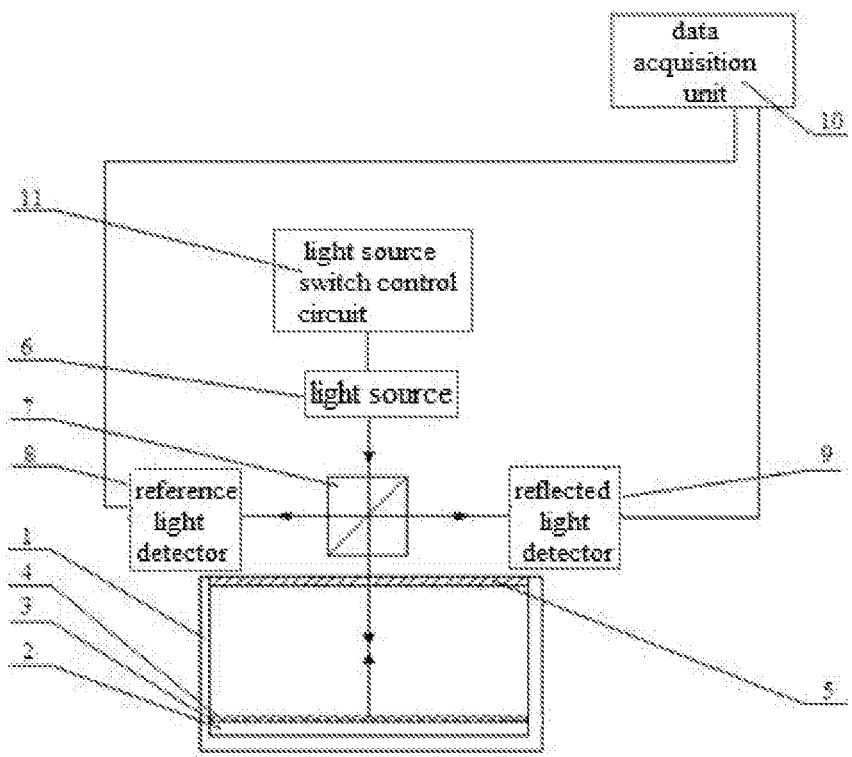
FIG. 2 is a schematic structural diagram of an apparatus for online and real-time detection of a temperature of an epitaxial wafer according to a second embodiment of the present invention.
Figure 3:
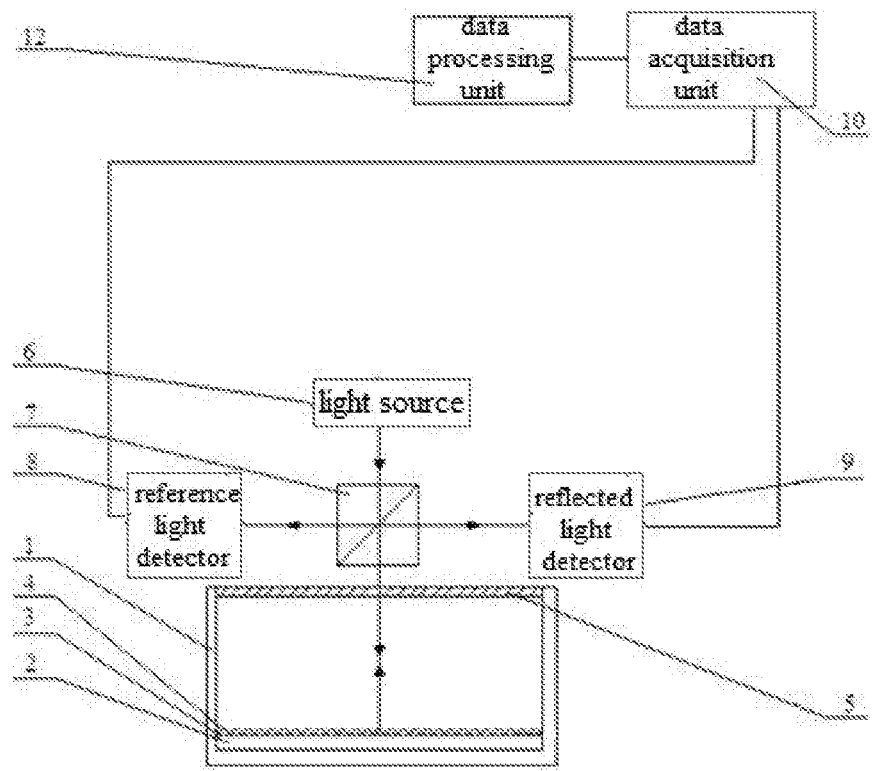
FIG. 3 is a schematic structural diagram of an apparatus for online and real-time detection of a temperature of an epitaxial wafer according to a third of the present invention.
Figure 4:
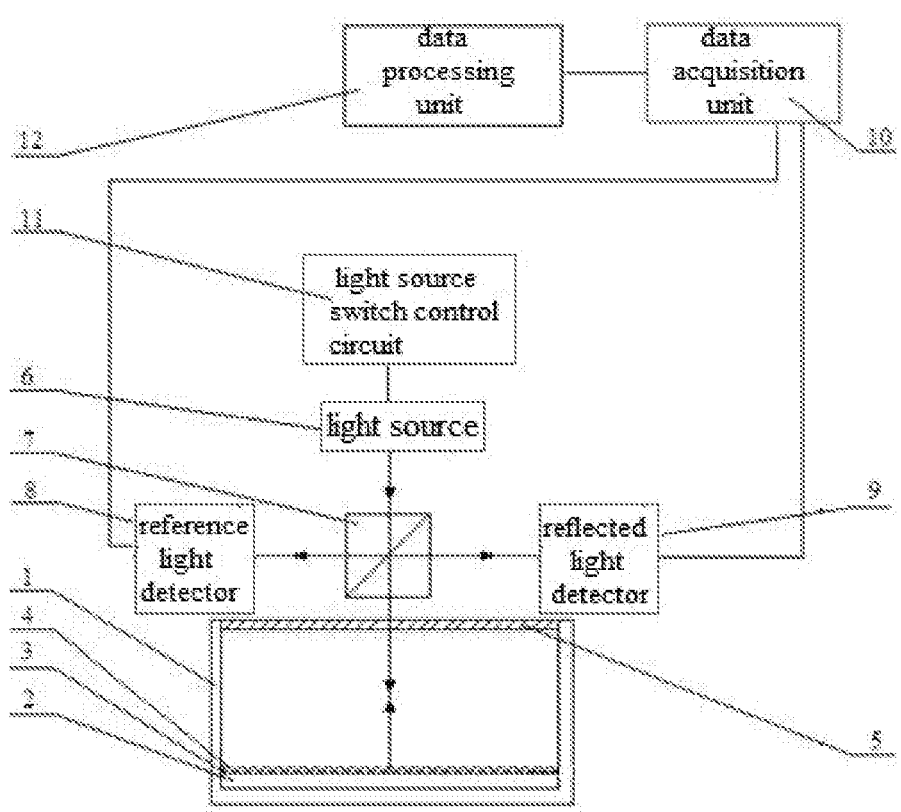
FIG. 4 is a schematic structural diagram of an apparatus for online and real-time detection of a temperature of an epitaxial wafer according to a fourth embodiment of the present invention.
Figure 6:
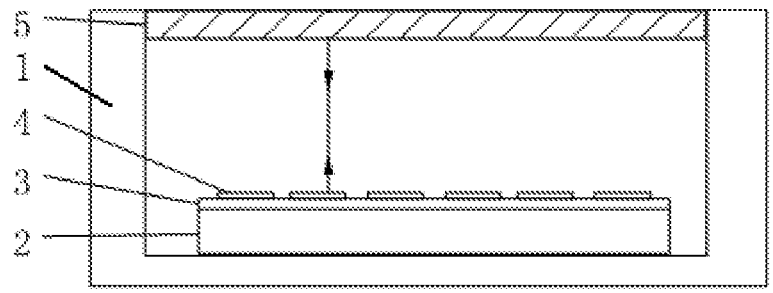
FIG. 6 is a partially enlarged schematic view showing the portion of a MOCVD reaction chamber in the apparatus for online and real-time detection of a temperature of an epitaxial wafer according to the first to fifth embodiments of the present invention.

Referring to FIG. 1 and FIG. 6, an apparatus for online and real-time detection of a temperature of an epitaxial wafer according to an embodiment of the present invention may comprise a MOCVD reaction chamber 1, a light source 6, a beam splitter 7, a reference light detector 8, a reflected light detector 9, and a data acquisition unit 10.

Figure 7:
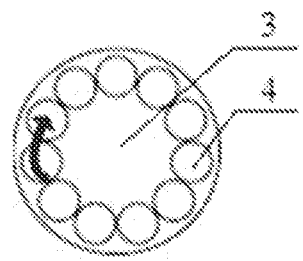
FIG. 7 is a schematic structural diagram of an epitaxial wafer and a graphite susceptor in the apparatus for online and real-time detection of a temperature of an epitaxial wafer according to the first to fifth embodiments of the present invention.

Referring to FIG. 7, the MOCVD reaction chamber 1 is provided with a graphite susceptor 3 therein. The graphite susceptor 3 is able to rotate and is used to bear an epitaxial wafer 4. A top of the MOCVD reaction chamber 1 is provided with a reaction chamber window 5 for enabling light to pass therethrough.

The light source 6 is used for generating a light beam.

The beam splitter 7 may split the light beam received from the light source 6 into two beams, one of which after entering the reference light detector 8, forms a first path of electrical signal representing a reference light intensity, and the other of which passes through the reaction chamber window 5 and then strikes on the epitaxial wafer 4, and is reflected by the epitaxial wafer 4 to form a reflected light beam. The reflected light beam forms a second path of electrical signal after passing through the reflected light detector 9.

The data acquisition unit 10 is configured to acquire an identity information of the epitaxial wafer 4, the first path of electrical signal, and the second path of electrical signal.

Referring to FIGS. 2 to 4 and FIG. 6, the apparatus for online and real-time detection of a temperature of an epitaxial wafer according to the second to fourth embodiments of the present invention may further comprise a light source switch control circuit 11 and/or a data processing unit 12. The light source switch control circuit 11 is used to control on and off of the light source 6, and the data processing unit 12 is configured to process signals acquired by the data acquisition unit 10, thereby implementing intelligent control of on and off of the light source 6 and/or intelligent processing of the signals acquired by the data acquisition unit 10.

Figure 5:
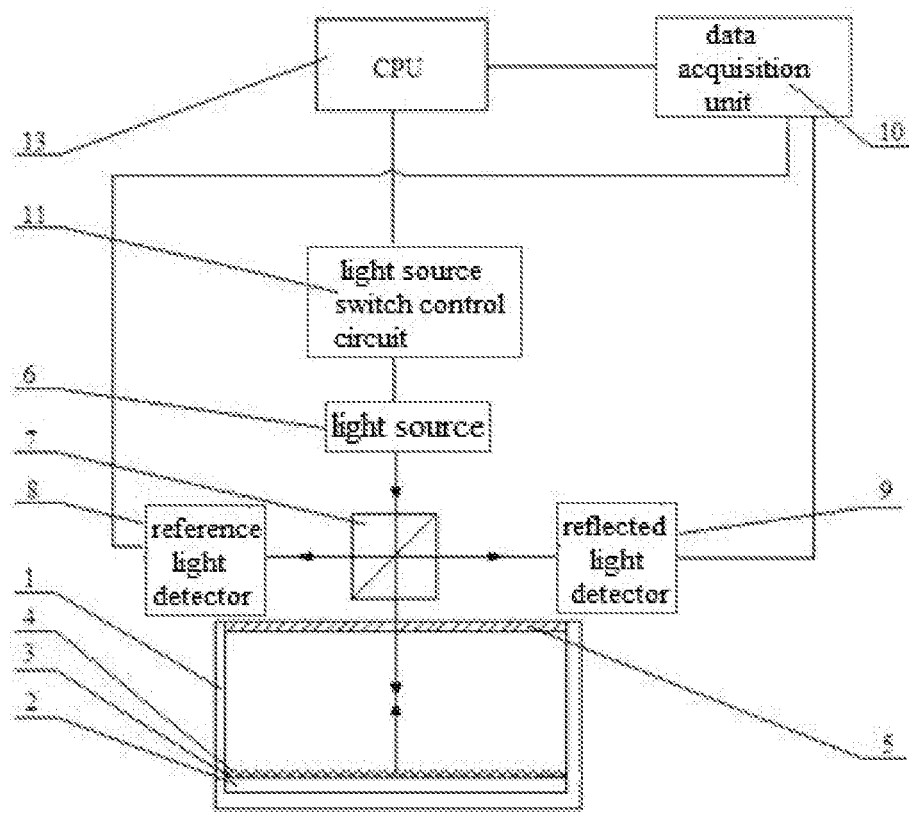
FIG. 5 is a schematic structural diagram of an apparatus for online and real-time detection of a temperature of an epitaxial wafer according to a fifth embodiment of the present invention.

Referring to FIG. 5 and FIG. 6, the apparatus for online and real-time detection of a temperature of an epitaxial wafer according to the fifth embodiment of the present invention further comprises a CPU 13. The CPU 13 is used to control the switch control circuit 11 so as to control the on and off of the light source 6. Moreover, the CPU 13 is also used to process the signals acquired by the data acquisition unit 10. Therefore, the structure of the apparatus for online and real-time detection of a temperature of an epitaxial wafer according to this embodiment is more compact compared with the second to fourth embodiments of the present invention.

When the light source 6 is turned on, the second path of electrical signal is a sum of a reflected light intensity of the epitaxial wafer 4 and a thermal radiation intensity of the epitaxial wafer 4. When the light source 6 is turned off, the second path of electrical signal is a thermal radiation intensity of the epitaxial wafer 4.

Figure 8:
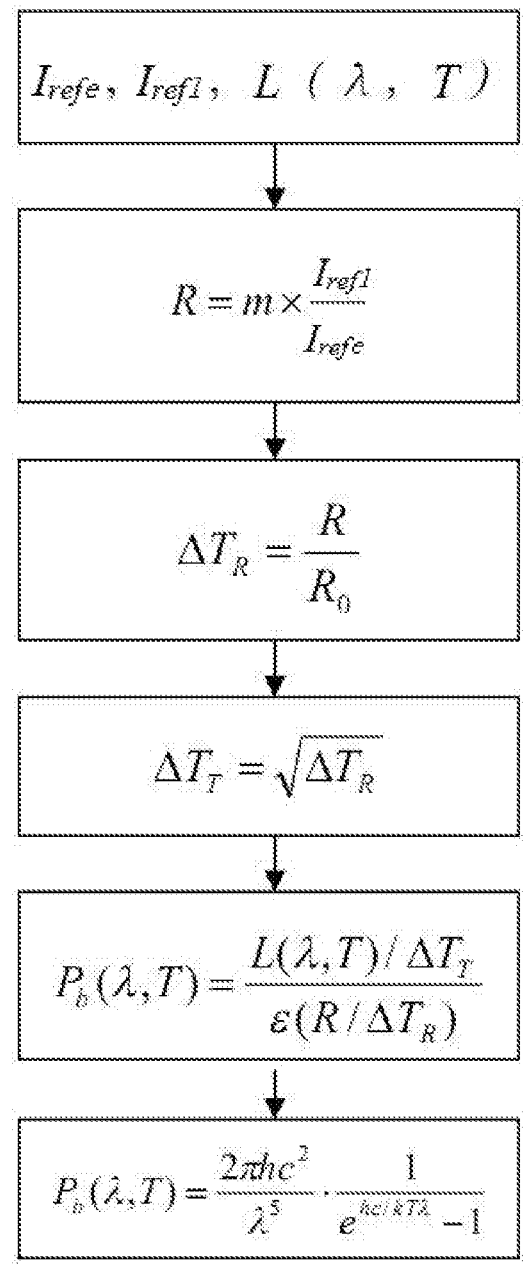
FIG. 8 is a flowchart of a method for online and real-time detection of a temperature of an epitaxial wafer according to an embodiment of the present invention.

Referring to FIG. 8, a method for online and real-time detection of a temperature of an epitaxial wafer according to an embodiment may comprise the following steps:

Step 1: obtaining a reflected light intensity of the epitaxial wafer 4 and a thermal radiation intensity of the epitaxial wafer 4 based on a second path of electrical signal detected by a reflected light detector 9 when a light source 6 is turned on and a second path of electrical signal detected by the reflected light detector 9 when the light source 6 is turned off, respectively, $$I_{refl} = I_{on} - I_{off}$$

$$L(\lambda, T) = I_{off}$$

where, $I_{on}$ is a second path of electrical signal detected by the reflected light detector 9 when the light source 6 is turned on, $I_{off}$ is a second path of electrical signal detected by the reflected light detector 9 when the light source 6 is turned off, $I_{refl}$ is a reflected light intensity of the epitaxial wafer 4, $L(\lambda, T)$ is a thermal radiation intensity of the epitaxial wafer 4;

Step 2: obtaining a reflectance of the epitaxial wafer 4 based on the reflected light intensity of the epitaxial wafer 4 and a reference light intensity, $$R = m \times \frac{I_{refl}}{I_{refe}} \quad (1)$$

where

R is a reflectance of the epitaxial wafer, m is a ratio of light intensity of a reference light to an incident light, $I_{refl}$ is a reflected light intensity of the epitaxial wafer, $I_{refe}$ is a reference light intensity;

Step 3: obtaining a reflectance attenuation factor caused by a coating of a reaction chamber window 5 based on a reflectance of the epitaxial wafer 4 and an ideal reflectance of the epitaxial wafer 4, $$\Delta T_R = \frac{R}{R_0} \quad (2)$$

where, $\Delta T_R$ is a reflectance attenuation factor caused by the coating of the reaction chamber window 5, R is a reflectance of the epitaxial wafer 4, $R_0$ is an ideal reflectance of the epitaxial wafer 4;

Step 4: obtaining a thermal radiation attenuation factor caused by the coating of the reaction chamber window 5 based on the reflectance attenuation factor caused by the coating of the reaction chamber window 5, $$\Delta T_T = \sqrt{\Delta T_R} \quad (3)$$

where, $\Delta T_T$ is a thermal radiation attenuation factor caused by the coating of the reaction chamber window 5, $\Delta T_R$ is a reflectance attenuation factor caused by the coating of the reaction chamber window 5;

Step 5: calculating a black-body thermal radiation value $P_b(\lambda, T)$ of the epitaxial wafer 4 based on the thermal radiation intensity $L(\lambda, T)$ of the epitaxial wafer 4, the reflectance R of the epitaxial wafer 4, the thermal radiation attenuation factor $\Delta T_T$ caused by the coating of the reaction chamber window 5, and the reflectance attenuation factor $\Delta T_R$ caused by the coating of the reaction chamber window 5, $$P_b(\lambda, T) = \frac{L(\lambda, T)/\Delta T_T}{\varepsilon(R/\Delta T_R)} \quad (4)$$

where, $P_b(\lambda, T)$ is a black-body thermal radiation value, $L(\lambda, T)$ is a thermal radiation intensity of the epitaxial wafer 4, R is a reflectance of the epitaxial wafer 4, $\Delta T_T$ is a thermal radiation attenuation factor caused by the coating of the reaction chamber window 5, $\Delta T_R$ is a reflectance attenuation factor caused by the coating of the reaction chamber window 5, $\varepsilon(R/\Delta T_R)$ is a thermal emissivity of the epitaxial wafer 4;

Step 6: obtaining a temperature T of the epitaxial wafer 4 based on a correspondence relationship between the black-body thermal radiation value $P_b(\Delta, T)$ and the temperature T of the epitaxial wafer 4, $$P_b(\lambda, T) = \frac{2\pi hc^2}{\lambda^5} \cdot \frac{1}{e^{hc/kT\lambda} - 1} \quad (5)$$

where,
$P_b(\lambda, T)$ is an ideal black-body thermal radiation value,
h is Planck constant,
k is Boltzmann constant,
c is light speed,
λ is wavelength,
T is temperature.

In some embodiments, as a specific step of obtaining the thermal emissivity $\varepsilon(R/\Delta T_R)$ of the epitaxial wafer 4, the method for online and real-time detection of a temperature of an epitaxial wafer according to an embodiment of the present invention may further comprise a step of selecting to obtain the thermal emissivity $\varepsilon(R/\Delta T_R)$ of the epitaxial wafer 4.

In some embodiments, when the coating of the reaction chamber window 5 is formed as an ideal opaque, smooth and flat surface, $$\varepsilon(R/\Delta T_R) = 1 - R/\Delta T_R$$

where,
R is a reflectance of the epitaxial wafer,
$\Delta T_R$ is a reflectance attenuation factor caused by the coating of the reaction chamber window,
$\varepsilon(R/\Delta T_R)$ is a thermal emissivity of the epitaxial wafer.

In some embodiments, when the reaction chamber window is coated, and the substrate is transparent and single-side polished, $$\varepsilon(R/\Delta T_R) = \varepsilon_{carr}(1-R/\Delta T_R)(1-R_{diff})\{1+R/\Delta T_R * R_{diff} + (1-\varepsilon_{carr})[(R_{diff}+R/\Delta T_R(1-R_{diff})^2)]\}$$

where,
$\varepsilon(R/\Delta T_R)$ is a thermal emissivity of the epitaxial wafer 4,
R is a reflectance of the epitaxial wafer 4,
$R_{diff}$ is a scattering rate of a non-smooth substrate,
$\varepsilon_{carr}$ is a thermal emissivity of a graphite susceptor,
$\Delta T_R$ is a reflectance attenuation factor caused by the coating of the reaction chamber window 5.

In an embodiment, as a specific step of obtaining the ratio of light intensity m of a reference light to an incident light, the method for online and real-time detection of a temperature of an epitaxial wafer according to the present invention may further comprise a step of obtaining a ratio of light intensity m of the reference light to the incident light, and the ratio of light intensity m is obtained by the following formula:

$$R_{standard} = m \times \frac{I_{refl}}{I_{refe}}$$

where,
$R_{standard}$ is a reflectance of an epitaxial wafer having a standard reflectance,
m is a ratio of the light intensity of the reference light to the incident light,
$I_{refl}$ is a reflected light intensity of the epitaxial wafer 4,
$I_{refe}$ is a reference light intensity.

The apparatus and the method for online and real-time detection of a temperature of an epitaxial wafer according to the present disclosure can obtain the thermal radiation attenuation factor $\Delta T_T$ caused by the coating of the reaction chamber window 5 and the reflectance attenuation factor $\Delta T_R$ caused by the coating of the reaction chamber window 5 for the epitaxial wafer 4, apply the two attenuation factors $\Delta T_T$ and $\Delta T_R$ to a calculation process of the black-body thermal radiation value of the epitaxial wafer 4, and take advantage of the relationship between the black-body thermal radiation value of the epitaxial wafer 4 obtained by calculation and the temperature of the epitaxial wafer 4, thereby eliminating the effect of the coating of the reaction chamber window 5 on the online and real-time temperature detection value and improving the accuracy of the online and real-time temperature detection value.

The above embodiments have described the objects, the technical solutions and the advantageous effects of the invention in detail. It should be appreciated that the above embodiments are only specific embodiments of the invention and are not intended to limit the invention. Any modifications, equivalent substitutions, improvements, etc., made within the spirit and principle of the invention, are intended to be included within the scope of the invention.

The invention claimed is:

1. An apparatus for online and real-time detection of a temperature of an epitaxial wafer, comprising a MOCVD reaction chamber, a light source, a beam splitter, a reference light detector, a reflected light detector and a data acquisition unit, wherein,
   the MOCVD reaction chamber is provided with a graphite susceptor therein, the graphite susceptor being able to rotate and used to bear the epitaxial wafer, and a top of the MOCVD reaction chamber is provided with a reaction chamber window for enabling light to pass therethrough;
   the light source is configured to generate a light beam;
   the beam splitter is configured to split the light beam received from the light source into two beams, and wherein one of the two beams after entering the reference light detector, forms a first path of electrical signal, and the other of the two beams passes through the reaction chamber window and then strikes on the epitaxial wafer and forms a reflected light beam after being reflected by the epitaxial wafer, the reflected light beam forming a second path of electrical signal after passing through the reflected light detector; and
   the data acquisition unit is configured to acquire the first path of electrical signal and the second path of electrical signal.

2. The apparatus of claim 1, further comprising a light source switch control circuit and/or a data processing unit, the light source switch control circuit being used to control on and off of the light source, the data processing unit being configured to process signals acquired by the data acquisition unit.

3. The apparatus of claim 1, further comprising a CPU, the CPU is configured to control the switch control circuit so as to control the on and off of the light source, and further to process signals acquired by the data acquisition unit.

4. The apparatus of claim 1, wherein when the light source is turned on, the second path of electrical signal is a sum of a reflected light intensity of the epitaxial wafer and a thermal radiation intensity of the epitaxial wafer; and
   when the light source is turned off, the second path of electrical signal is a thermal radiation intensity of the epitaxial wafer.

5. A method for online and real-time detection of a temperature of an epitaxial wafer based on the apparatus of claim 1, comprising:
   Step 1: obtaining a reflected light intensity of the epitaxial wafer and a thermal radiation intensity of the epitaxial wafer respectively based on a second path of electrical signal detected by a reflected light detector when a light source is turned on and a second path of electrical signal detected by the reflected light detector when the light source is turned off, $I_{refl}=I_{on}-I_{off}$ $L(\lambda,T)=I_{off}$ where, Ion is the second path of electrical signal detected by the reflected light detector when the light source is turned on, Ioff is the second path of electrical signal detected by the reflected light detector when the light source is turned off, Irefl is the reflected light intensity of the epitaxial wafer, L ($\lambda$, T) is the thermal radiation intensity of the epitaxial wafer;

Step 2: obtaining a reflectance of the epitaxial wafer based on the reflected light intensity of the epitaxial wafer and a reference light intensity, $$R = m \times \frac{I_{refl}}{I_{refe}} \quad (1)$$

where,

R is the reflectance of the epitaxial wafer, m is a ratio of light intensity of a reference light to an incident light, Irefl is a reflected light intensity of the epitaxial wafer, Irefe is the reference light intensity;

Step 3: obtaining a reflectance attenuation factor caused by a coating of a reaction chamber window based on the reflectance of the epitaxial wafer and an ideal reflectance of the epitaxial wafer, $$\Delta T_R = \frac{R}{R_0} \quad (2)$$

where, $\Delta TR$ is the reflectance attenuation factor caused by the coating of the reaction chamber window, R is the reflectance of the epitaxial wafer, R0 is the ideal reflectance of the epitaxial wafer;

Step 4: obtaining a thermal radiation attenuation factor caused by the coating of the reaction chamber window based on the reflectance attenuation factor caused by the coating of the reaction chamber window, $$\Delta T_T = \sqrt{\Delta T_R} \quad (3)$$

where, $\Delta TT$ is the thermal radiation attenuation factor caused by the coating of the reaction chamber window, $\Delta TR$ is the reflectance attenuation factor caused by the coating of the reaction chamber window;

Step 5: calculating a black-body thermal radiation value Pb ($\lambda$, T) of the epitaxial wafer based on the thermal radiation intensity L ($\lambda$, T) of the epitaxial wafer, the reflectance R of the epitaxial wafer, the thermal radiation attenuation factor $\Delta TT$ caused by the coating of the reaction chamber window, and the reflectance attenuation factor $\Delta TR$ caused by the coating of the reaction chamber window, $$P_b(\lambda, T) = \frac{L(\lambda, T)/\Delta T_T}{\varepsilon(R/\Delta T_R)} \quad (4)$$

where,

Pb ($\lambda$, T) is the black-body thermal radiation value,

L ($\lambda$, T) is the thermal radiation intensity of the epitaxial wafer,

R is the reflectance of the epitaxial wafer, $\Delta TT$ is the thermal radiation attenuation factor caused by the coating of the reaction chamber window, $\Delta TR$ is the reflectance attenuation factor caused by the coating of the reaction chamber window, $\varepsilon(R/\Delta T_R)$ is a thermal emissivity of the epitaxial wafer;

Step 6: obtaining a temperature T of the epitaxial wafer based on a correspondence relationship between the black-body thermal radiation value Pb ($\lambda$, T) and the temperature T of the epitaxial wafer, $$P_b(\lambda, T) = \frac{2\pi hc^2}{\lambda^5} \cdot \frac{1}{e^{hc/kT\lambda} - 1} \quad (5)$$

where,

Pb ($\lambda$, T) is an ideal black-body thermal radiation value, h is Planck constant, k is Boltzmann constant, c is light speed, $\lambda$ is wavelength, T is temperature.

6. The method of claim 5, further comprising a step of selecting to obtain the thermal emissivity $\varepsilon(R/\Delta T_R)$ of the epitaxial wafer, wherein when the coating of the reaction chamber window is formed as an ideal opaque, smooth and flat surface, $$\varepsilon(R/\Delta T_R)=1-R/\Delta T_R$$

where,

R is the reflectance of the epitaxial wafer, $\Delta TR$ is the reflectance attenuation factor caused by the coating of the reaction chamber window, $\varepsilon(R/\Delta T_R)$ is the thermal emissivity of the epitaxial wafer.

7. The method of claim 5, further comprising a step of selecting to obtain the thermal emissivity $\varepsilon(R/\Delta T_R)$ of the epitaxial wafer, wherein when the reaction chamber window is coated, and the substrate is transparent and single-side polished, $$\varepsilon(R/\Delta T_R)=\varepsilon_{carr}(1-R/\Delta T_R)(1-R_{diff})\{1+R/\Delta T_R*R_{diff}+(1-\varepsilon_{carr})[(R_{diff}+R/\Delta T_R(1-R_{diff})^2)]\}$$

where, $\varepsilon(R/\Delta T_R)$ is the thermal emissivity of the epitaxial wafer, R is the reflectance of the epitaxial wafer, $R_{diff}$ is a scattering rate of a non-smooth substrate, $\varepsilon_{carr}$ is the thermal emissivity of the graphite susceptor, and $\Delta TR$ is the reflectance attenuation factor caused by the coating of the reaction chamber window.

8. The method of claim 5, further comprising a step of obtaining the ratio of light intensity m of the reference light to the incident light, the ratio of light intensity m is obtained by a formula:

$$R_{standard} = m \times \frac{I_{refl}}{I_{refe}}$$

where,

Rstandard is the reflectance of the epitaxial wafer having a standard reflectance, m is the ratio of light intensity of the reference light to the incident light, Irefl is the reflected light intensity of the epitaxial wafer, and Trefe is the reference light intensity.

9. The apparatus of claim 2, wherein when the light source is turned on, the second path of electrical signal is a sum of a reflected light intensity of the epitaxial wafer and a thermal radiation intensity of the epitaxial wafer; and when the light source is turned off, the second path of electrical signal is a thermal radiation intensity of the epitaxial wafer.

10. The apparatus of claim 3, wherein when the light source is turned on, the second path of electrical signal is a sum of a reflected light intensity of the epitaxial wafer and a thermal radiation intensity of the epitaxial wafer; and when the light source is turned off, the second path of electrical signal is a thermal radiation intensity of the epitaxial wafer.

* * * * *